United States Patent
Douglas et al.

[11] Patent Number: 5,926,556
[45] Date of Patent: Jul. 20, 1999

[54] SYSTEMS AND METHODS FOR IDENTIFYING A MOLDED CONTAINER

[75] Inventors: Robert J. Douglas, Palm Harbor; Bozidar Kosta, Clearwater; Coleman W. Gormley, Largo; Edward R. Krajcik; Philippe Spiteri, both of St. Petersburg, all of Fla.

[73] Assignee: Inex, Inc., Clearwater, Fla.

[21] Appl. No.: 08/707,320

[22] Filed: Sep. 3, 1996

Related U.S. Application Data

[60] Provisional application No. 60/017,416, May 8, 1996.

[51] Int. Cl.$^6$ .................................................. G06K 9/00
[52] U.S. Cl. ...................... 382/142; 382/293; 250/223 B
[58] Field of Search ................... 382/142, 173, 382/149, 217, 266, 218, 143, 293, 141; 341/13; 348/86, 92, 127; 356/394, 240; 364/468.17, 468.22, 473.01, 473.02, 552, 555; 65/29.12; 209/523, 524, 526, 528; 250/557, 559.39, 559.41, 559.44, 223 B

[56] References Cited

U.S. PATENT DOCUMENTS

| | | | |
|---|---|---|---|
| 3,777,151 | 12/1973 | Ortlieb | 250/201 |
| 3,923,158 | 12/1975 | Fornåå | 209/75 |
| 3,963,918 | 6/1976 | Jensen et al. | 250/223 B |
| 3,991,883 | 11/1976 | Hobler et al. | 209/73 |
| 4,004,904 | 1/1977 | Fergusson | 65/158 |
| 4,047,000 | 9/1977 | Bryant et al. | 235/151.1 |
| 4,175,236 | 11/1979 | Juvinall | 250/566 |
| 4,230,266 | 10/1980 | Juvinall | 235/490 |
| 4,332,606 | 6/1982 | Gardner | 65/158 |
| 4,413,738 | 11/1983 | Pemberton et al. | 209/523 |
| 4,431,436 | 2/1984 | Lulejian | 65/159 |
| 4,644,151 | 2/1987 | Juvinall | 250/223 B |
| 4,675,042 | 6/1987 | Taddei-Contreras | 65/158 |
| 4,691,830 | 9/1987 | Ahl et al. | 209/523 |
| 4,713,536 | 12/1987 | Williams et al. | 250/223 B |
| 4,876,457 | 10/1989 | Bose | 250/563 |
| 4,891,530 | 1/1990 | Hatji | 250/572 |
| 4,906,098 | 3/1990 | Thomas et al. | 356/376 |
| 4,967,070 | 10/1990 | Ringlien et al. | 250/223 B |
| 5,028,769 | 7/1991 | Claypool et al. | 235/454 |
| 5,038,384 | 8/1991 | Ohoba | 382/142 |
| 5,095,204 | 3/1992 | Novini | 250/223 B |
| 5,204,911 | 4/1993 | Schwartz et al. | 382/142 |
| 5,301,238 | 4/1994 | Apter et al. | 382/142 |
| 5,414,777 | 5/1995 | van der Schaar et al. | 382/142 |
| 5,453,612 | 9/1995 | Toyama et al. | 250/223 B |
| 5,510,610 | 4/1996 | Baldwin | 250/223 B |

FOREIGN PATENT DOCUMENTS

| | | | |
|---|---|---|---|
| 0 009 955 A1 | 10/1979 | European Pat. Off. | G06K 19/06 |
| 40 27 992 C 1 | 9/1990 | Germany | G06K 7/14 |

*Primary Examiner*—Leo H. Boudreau
*Assistant Examiner*—Brian P. Werner
*Attorney, Agent, or Firm*—Senniger, Powers, Leavitt & Roedel

[57] ABSTRACT

Systems and methods of operation thereof for identifying containers handled by a container handling apparatus. Each container has a portion that includes one of a plurality of identifying patterns. A camera generates an image of at least the portion of the container including the identifying pattern wherein the image includes a pattern image corresponding to the identifying pattern. An image processor detects an optical characteristic of the image within a defined region of the image and detects the pattern image as a function of the detected characteristic. The defined region of the image includes the pattern image corresponding to the identifying pattern. The image processor determines the container's identifying pattern as a function of the pattern image detected by the image processor thereby to identify the container.

29 Claims, 8 Drawing Sheets

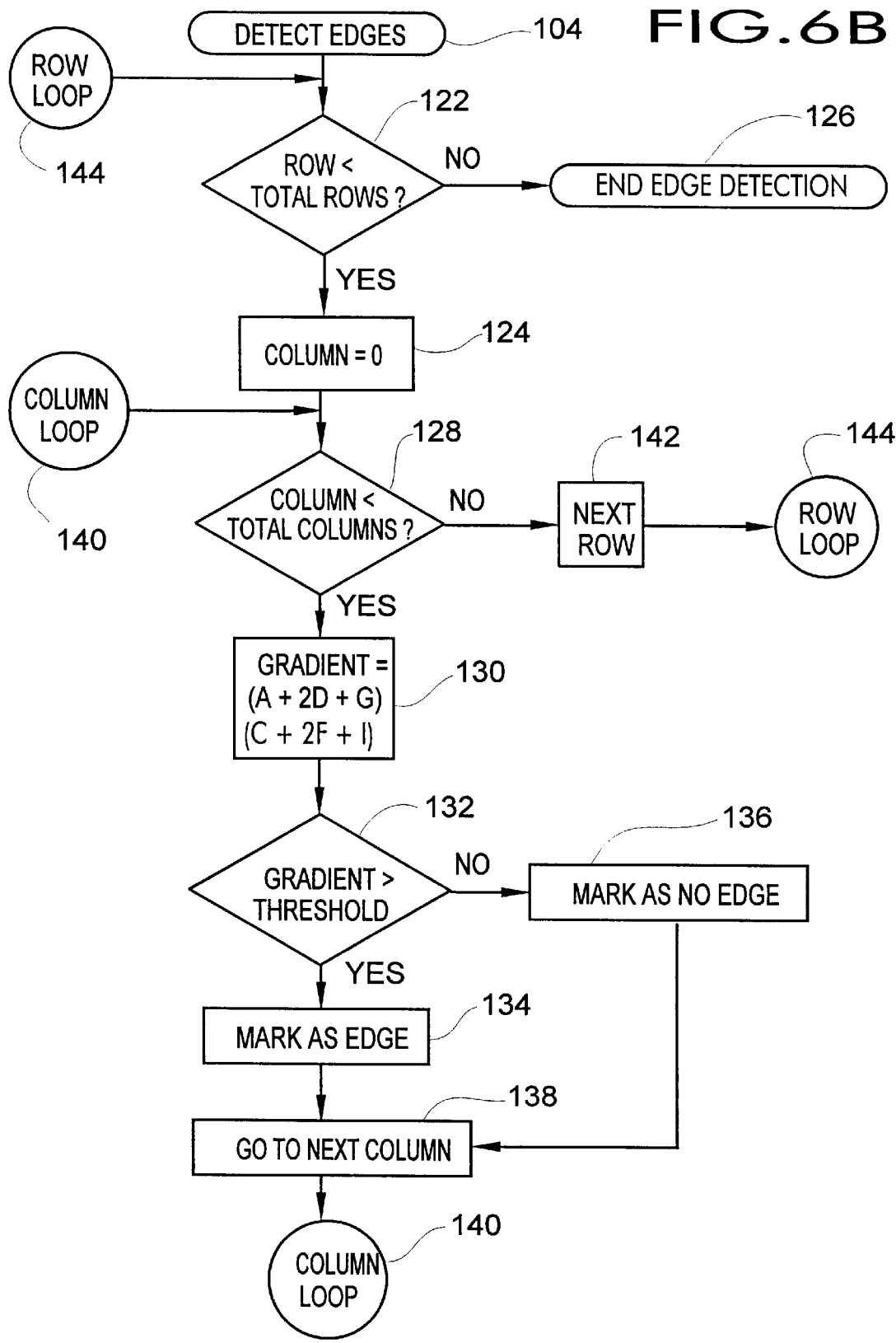

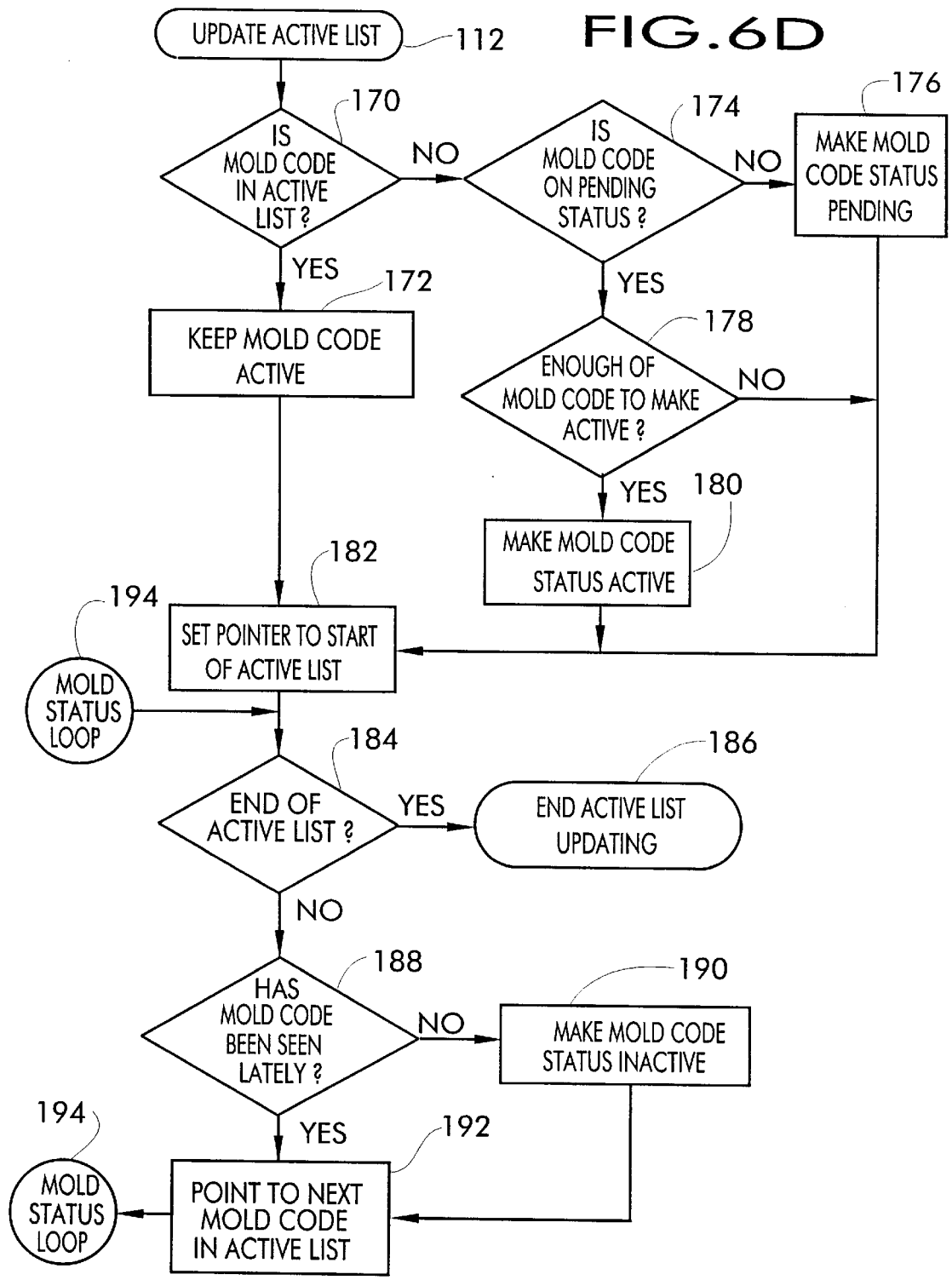

SYSTEMS AND METHODS FOR IDENTIFYING A MOLDED CONTAINER

CROSS-REFERENCE TO RELATED APPLICATION

This application claims the benefit of Provisional Application Serial No. 60/017,416, filed May 8, 1996, the entire disclosure of which is incorporated herein by reference.

BACKGROUND OF THE INVENTION

The invention generally relates to container inspection systems and, particularly, to a system for identifying a molded container with respect to its mold of origin.

Container molding machines, referred to in the industry as individual section (IS) machines, are used to form containers, such as glass bottles and jars. Typically, an IS machine has a number of sections, each section having multiple cavities or molds, in which molten glass is formed into the desired container shape. Because container variations or defects are often related to a particular container's associated mold of origin, identification systems are used to identify which of the multiple molds produced the particular container. This information enables an operator to adjust, repair, replace or disable any molds found to be producing defective containers. However, as the number of sections per machine, and the number of molds per section, increases, the identification process becomes more complicated and time-consuming.

In general, a code molded into the bottom wall of a container during the forming process indicates the container's mold of origin. Typical mold codes include: dot codes consisting of peanut-shaped dots in the container's bottom; heel codes consisting of dots or bars in the container's heel; and circular ring codes consisting of concentric rings in the container's bottom.

Presently available systems for reading mold codes require that the container under inspection first be stopped and then rotated to read the container's mold code. Stopping and rotating each container, however, delays the inspection process. This often results in the need to split the production line into multiple branches, each having separate mold identification equipment. Therefore, a system that improves the performance of mold code identification by reading mold codes while the containers continue their movement along the process line is desired.

Although identification systems are available that do not require relative rotation between the readers and containers, such systems are limited to reading only specific types of mold codes. Therefore, a system capable of identifying a variety of different types of mold codes used by different container manufacturers, in addition to distinguishing between different mold codes of the same type, is also desired.

SUMMARY OF THE INVENTION

Among the objects of the invention are to provide an improved system and method of inspecting a molded container which overcome at least some of the disadvantageous conditions described above; to provide such a system and method which determine the container's mold code; to provide such a system and method which do not require stopping and rotating the container; to provide such system and method which permit identification of various types of mold codes; to provide such system and method which permit use with an automated inspection system; to provide such system and method which permit use with an automated container handling apparatus; and to provide such a system and method which are efficient, reliable, economical and convenient to use.

Briefly described, a system embodying aspects of the present invention inspects containers handled by a container handling apparatus to identify at least one of the containers. Each container has a portion that includes one of a plurality of identifying patterns and the system includes a camera for generating an image of at least the portion of the container including the identifying pattern. The image generated by the camera includes a pattern image corresponding to the identifying pattern. The system also includes an image processor for detecting an optical characteristic of the image within a defined region of the image and for detecting the pattern image as a function of the detected characteristic. The defined region of the image has a generally circular periphery and includes the pattern image corresponding to the identifying pattern. The image processor determines the container's identifying pattern as a function of the pattern image detected by the image processor thereby to identify the container.

Generally, another form of the invention is a method for identifying containers each having a portion including one of a plurality of identifying patterns. The method is for use with a container handling apparatus that handles the containers. The method includes the step of generating an image with a camera of at least the portion of the container including the identifying pattern wherein the image includes a pattern image corresponding to the identifying pattern. The method further includes the step of defining a region of the image that has a generally circular periphery and that includes the pattern image corresponding to the identifying pattern. Further steps of the method include detecting an optical characteristic of the image within the defined region and detecting the pattern image as a function of the detected characteristic. The method further includes determining the container's identifying pattern as a function of the detected pattern image thereby to identify the container.

Yet another form of the invention is a system for identifying containers each having a portion including one of a plurality of identifying patterns. The system is for use with a container handling apparatus that handles the containers and includes a camera for generating an image of at least the portion of the container including the identifying pattern. The image generated by the camera includes a pattern image corresponding to the identifying pattern. The system also includes an image processor for detecting an optical characteristic of the image and for detecting the pattern image as a function of the detected characteristic. A memory stores identification information corresponding to a plurality of pattern images, each of the plurality of pattern images corresponding to one of the plurality of identifying patterns. The image processor compares the detected pattern image to the plurality of pattern images and retrieves the identification information that corresponds to the identifying pattern of the container from the memory based on the comparison. In this manner, the image processor identifies the container. The image processor also updates the identification information stored in the memory as a function of the detected pattern image.

Another method embodying aspects of the invention is for identifying containers handled by a container handling apparatus. Each container has a portion that includes one of a plurality of identifying patterns. The method includes the step of generating an image with a camera of at least the portion of the container including the identifying pattern wherein the image includes a pattern image corresponding to the identifying pattern. The method also includes the steps of detecting an optical characteristic of the image and detecting the pattern image as a function of the detected characteristic. Another step of the method is storing identification information corresponding to a plurality of pattern images in a memory, each of the plurality of pattern images corresponding to one of the plurality of identifying patterns. Further steps of the method include comparing the detected pattern image to the plurality of pattern images and retrieving the identification information that corresponds to the identifying pattern of the container from the memory based on the comparison. In this manner, the container is identified. The method further includes updating the identification information stored in the memory as a function of the detected pattern image.

Other objects and features will be in part apparent and in part pointed out hereinafter.

BRIEF DESCRIPTION OF THE DRAWINGS

FIGS. 6A–6D illustrate an exemplary flow diagram of the operation of a computer of the system of FIG. 1.

Corresponding reference characters indicate corresponding parts throughout the drawings.

DETAILED DESCRIPTION OF THE PREFERRED EMBODIMENTS

Figure 1:
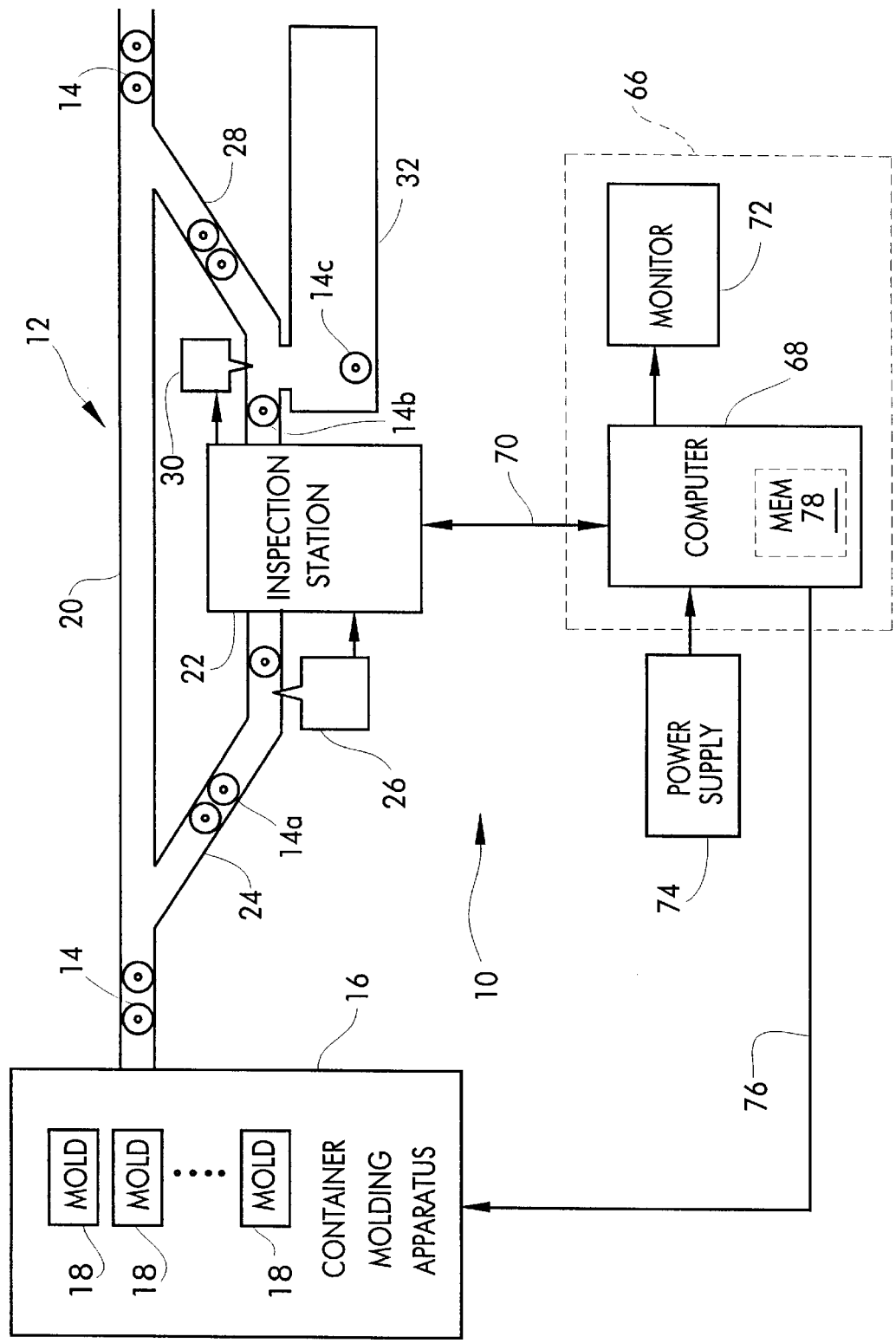
FIG. 1 is a block diagram of a system for inspecting containers according to a preferred embodiment of the invention in combination with a container handling apparatus transporting containers from a container molding apparatus to the system.

FIG. 1 illustrates a container inspection system 10 according to the present invention. In a preferred embodiment, the system 10 is for use with a container handling apparatus 12 that handles a plurality of containers 14, each formed by a container molding apparatus 16. The container molding apparatus 16 comprises an individual section (IS) machine having a plurality of molds, or cavities, 18 in which the containers 14 are formed from molten glass or other materials. After forming by container molding apparatus 16, a main conveyor 20 delivers containers 14 to an inspection station 22 for inspection. The main conveyer 20 may be any standard container moving apparatus known to those skilled in the art, such as a horizontal belt conveyer or a channel through which containers 14 are pushed.

As described above, container molding apparatus 16 has a plurality of individual sections (e.g., sixteen sections), with each section having a plurality of molds 18 (e.g., four molds). Such apparatus 16 is capable of producing containers 14 at a relatively high rate of speed (e.g., six hundred containers per minute). According to the invention, the speed of main conveyer 20 is preferably set to accommodate the relatively high rate of speed at which molding apparatus 16 produces containers 14. Inspection system 10 is also synchronized to this speed.

For glass container production, main conveyor 20 moves containers 14 from molding apparatus 16 through a lehr (not shown). The lehr subjects containers 14 to stress-relieving temperatures for annealing the glass. An infeed conveyor 24 then delivers containers 14 to the inspection station 22. A container 14a is shown on the infeed conveyor 24. System 10 inspects containers 14 at inspection station 22 to identify one of a plurality of identifying patterns. In the container manufacturing industry, each container 14 includes an identifying pattern that identifies the particular mold 18 in which container 14 originated. In addition to identifying container 14 with respect to its originating mold 18, system 10 preferably inspects container 14 for defects.

Before containers 14 enter inspection station 22, a container separator 26 spaces them apart at regular intervals to facilitate the inspection process. In one embodiment, the container separator 26 comprises a finger wheel apparatus having a plurality of fingers for engaging and separating containers 14 as they feed into inspection station 22 via infeed conveyor 24. In this manner, container separator 26 ensures that containers 14 will be evenly spaced. Preferably, the fingers are adjustable to accommodate containers 14 of different size.

After inspection, an outfeed conveyor 28 returns containers 14 to main conveyor 20. A container 14b is shown on the outfeed conveyor 28. In one embodiment, a rejector 30 removes containers 14 from outfeed conveyor 28 if they are found to be defective. The rejector 30 preferably comprises an air jet or mechanical ram for pushing defective containers 14, such as container 14c, from outfeed conveyor 28 to a reject accumulation conveyor 32 that is connected to outfeed conveyor 28. The reject accumulation conveyor 32 then collects each rejected container 14c for later disposal.

As shown in FIG. 1, containers 14 either travel through inspection station 22 or bypass it by remaining on main conveyor 20. Generally, all containers 14 are routed to inspection station 22 for inspection by system 10. However, it may be necessary on occasion to bypass system 10 to prepare for job changes or to perform other tasks such as routine maintenance. Thus, system 10 may include a diverting gate (not shown) for selectively diverting containers 14 from main conveyor 20 to infeed conveyor 24. In an alternative embodiment, inspection station 22 is located in-line with main conveyor 20 such that main conveyor 20 constitutes both infeed conveyor 24 and outfeed conveyor 28.

Figure 2:
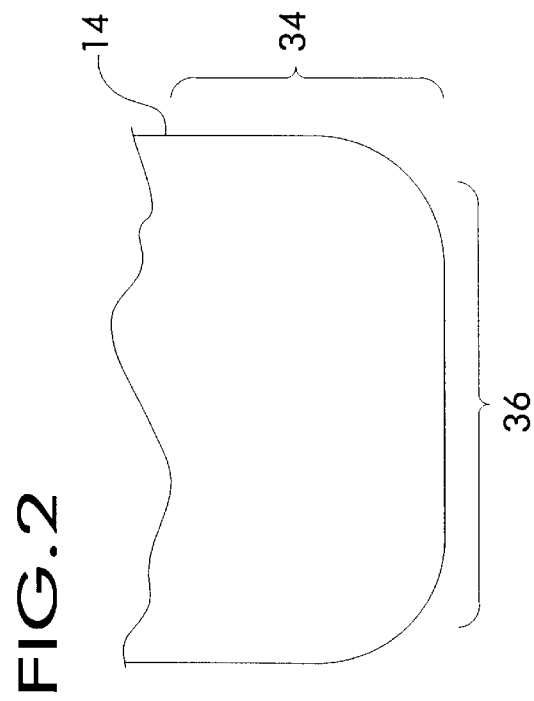
FIG. 2 is a fragmentary view of an exemplary container to be inspected by the system of FIG. 1.

FIG. 2 illustrates portions of one exemplary container 14 for inspection by system 10. Container 14, shown as a glass bottle, includes a heel portion 34 and a bottom portion 36. A set of markings (see FIGS. 5A and 5B) on the heel and/or bottom portions 34, 36 of container 14 provides an identifying pattern which corresponds to one of molds 18 for identifying container 14 with respect to its originating mold 18. One such identifying pattern of marks is a mold code, or mold number code. In the industry, a particular mold code is associated with each mold 18 of container molding apparatus 16 and is integrally molded in each container 14 formed in that particular mold 18. Inspection system 10 detects and decodes the mold code to determine which one of molds 18 formed container 14. In other words, each mold 18 provides a different one of a plurality of identifying patterns on heel portion 34 and/or bottom portion 36 of each container 14.

Mold codes are generally of three types: dot codes consisting of peanut-shaped dots molded into bottom portion 36 and arranged radially about the center of bottom portion 36; heel codes consisting of dots or bars molded into heel portion 34 and arranged radially about the center of bottom portion 36; and circular ring codes consisting of concentric rings molded into bottom portion 36 and centered about the center of bottom portion 36. It is to be understood, however, that the present invention provides improved mold identification for a variety of mold codes. In addition to the above-described types of mold codes, system 10 may be used to identify the mold of origin for containers having mold codes comprising, for example, lines or bars or marks which are shapes other than circular or elliptical. The position and spacing of the marks or lines represent a mold number. According to the present invention, inspection system 10 detects and decodes the various markings on heel portion 34 and/or bottom portion 36 to determine and identify the mold 18 which produced container 14. As a result, the molds 18 which produce unacceptable containers 14 can be readily identified. This permits feedback to the mold operator and/or an automated machine control for optimization of the process and elimination of defective containers 14.

Although container 14 is illustrated as a molded glass bottle in the present application, system 10 advantageously determines the mold number for different types of containers. Further, it is to be understood that the principles of the invention may also be applied to containers manufactured by a variety of processes from a variety of materials such as glass, plastic, metal and ceramic and to containers in which the identifying pattern is not molded into the container but printed thereon.

Figure 3:
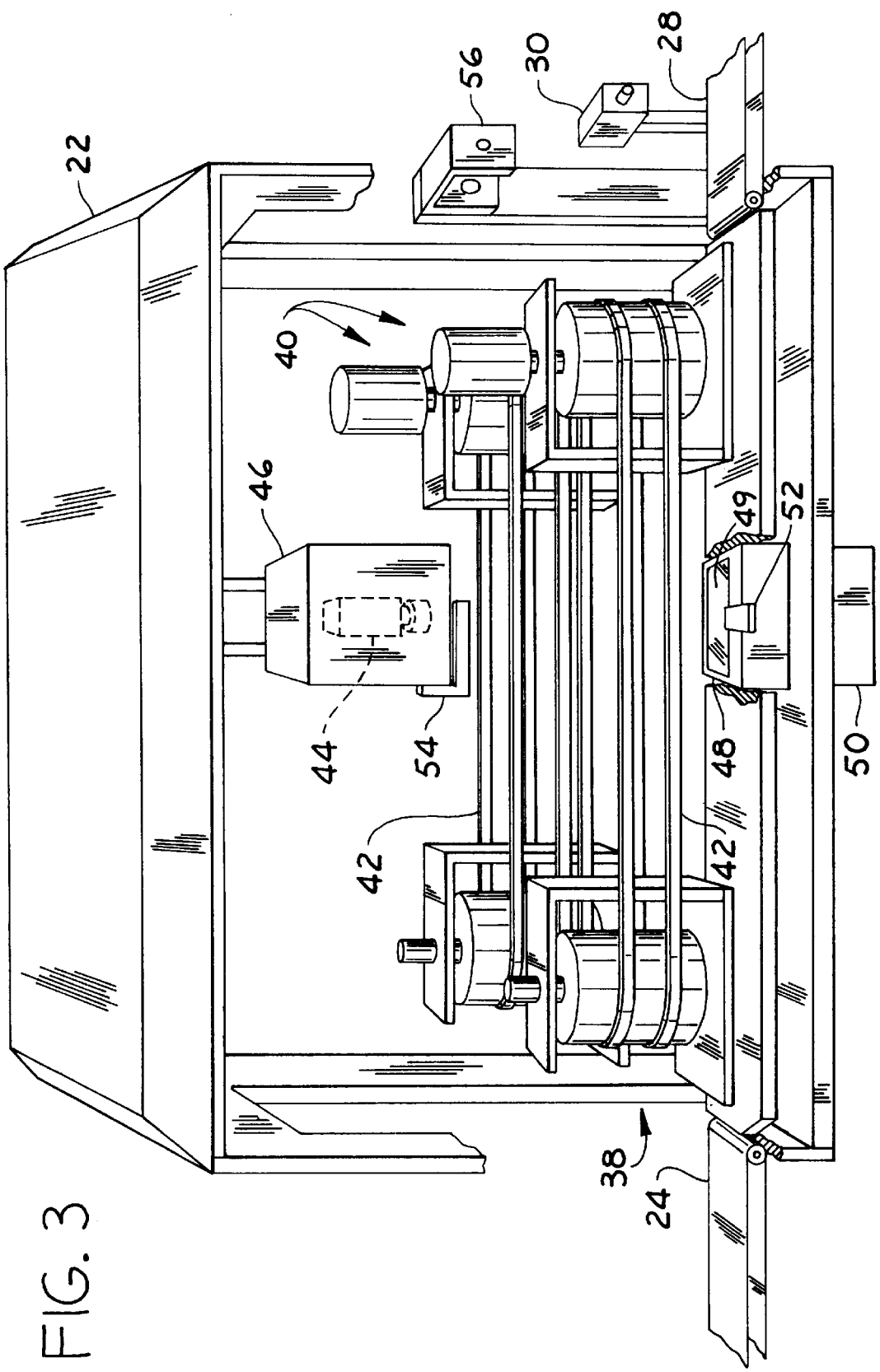
FIG. 3 is a perspective view of an inspection station of the system of FIG. 1 having portions broken away.

FIG. 3 illustrates the interior of inspection station 22. A container transport assembly 38, also referred to as a carry assembly, is adapted for moving containers 14 through inspection station 22. In a preferred embodiment of the invention, the transport assembly 38 includes a drive motor assembly 40 for driving a set of carry belts 42. The carry belts 42 engage the sides of containers 14 and transport them from infeed conveyor 24 to outfeed conveyor 28, passing through inspection station 22 in a relatively straight-line path. After inspection by system 10, transport assembly 38 deposits containers 14 on outfeed conveyor 28 for transport out of inspection station 22 and back to main conveyor 20.

As shown in FIG. 3, inspection station 22 includes a camera 44, shown in phantom, mounted in a camera box 46. Preferably, the camera 44 is a high resolution CCD (charge-coupled device) video camera. The camera box 46 positions and protects camera 44 above a base 48 adapted to receive at least one of the containers 14 handled by container handling apparatus 12. Camera box 46 includes a transparent window (not shown) through which camera 44 views container 14. The base 48 comprises a translucent or transparent plate 49 which has a planar, generally level top surface over which the container 14 is translated to allow illumination of base 36 and heel 34. Base 48, including the plate 49, is preferably mounted on a diffuser/strobe assembly 50 and the camera 44 is preferably positioned directly above base 48. According to the invention, container handling apparatus 12 transports at least one container 14 to inspection station 22 via infeed conveyor 24. Carry belts 42 of transport assembly 38 then move container 14 across base 48 for inspection.

In a preferred embodiment, system 10 employs position sensors for initiating various stages of the inspection process. A bottom acquisition sensor 52, mounted on base 48 at the front of the diffuser/strobe assembly 50, detects the position of container 14 relative to camera 44. In one embodiment, the acquisition sensor 52 detects bottom portion 36 of container 14 as it approaches the field of view of camera 44. Alternatively, system 10 includes a top acquisition position sensor 54 mounted at the front of camera box 46. Camera 44 is responsive to at least one of the acquisition sensors 52, 54 for generating an image of at least the portion of container 14 that includes the mold code as transport assembly 38 moves container 14 across base 48. According to the invention, either bottom acquisition sensor 52 or top acquisition sensor 54 constitutes a position sensor for detecting the presence of container 14 for inspection of its bottom portion 36. FIG. 3 also illustrates a rejector sensor 56 for sensing the position of containers 14 as they travel out of inspection station 22. A fixed time after the rejector sensor 56 senses the presence of container 14, rejector 30 receives an activating signal if container 14 failed inspection. Triggered by the activating signal, rejector 30 removes defective container 14 from the line and deposits it on reject accumulation conveyor 32.

Preferably, acquisition sensors 52, 54, as well as rejector sensor 56, operate in conjunction with encoders (not shown). The encoders generate feedback signals representing the movement of carry belts 42 and conveyor chains 24 and/or 28 which, in turn, further indicate the movement of containers 14 within inspection station 22 and subsequent movement of the container 14 to the rejector 30. In one embodiment, sensors 52, 54 and 56 are optoelectronic sensors.

Figure 4:
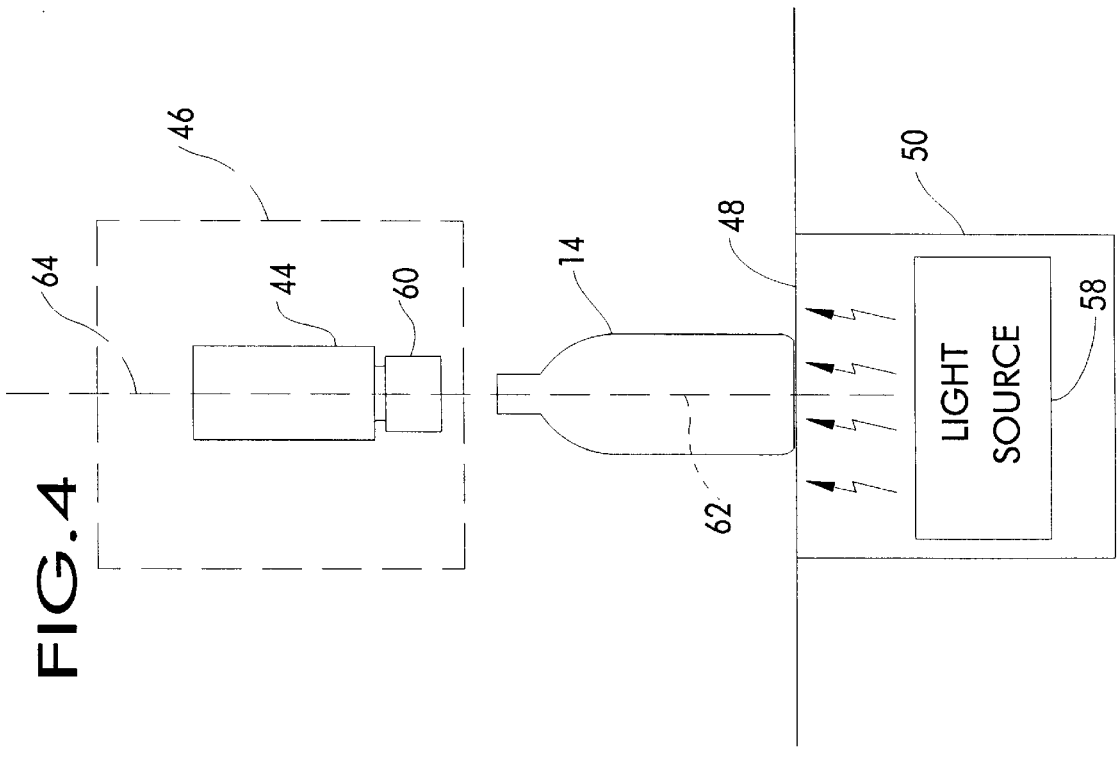
FIG. 4 is a diagrammatic view of the container of FIG. 2 and the inspection station of FIG. 3.

Referring now to FIG. 4, diffuser/strobe assembly 50 is shown below transport assembly 48 and centered directly below camera box 46. Preferably, the vertical position of camera box 46 may be adjusted to accommodate containers 14 of various heights. Although container 14 is shown in a vertical or upright orientation, it is to be understood that this orientation is merely illustrative. System 10 inspects container 14 without regard to the orientation of container 14 so long as the relationship between camera 44 and heel portion 34 and/or bottom portion 36 is generally the same.

As described above, container 14 has a portion (e.g., bottom portion 36 or heel portion 34) that includes the container's identifying pattern (e.g., a mold code). According to the invention, diffuser/strobe assembly 50 includes a light source 58 for illuminating container 14 and, particularly, for illuminating the portion including its mold code. Light source 58 of diffuser/strobe assembly 50 preferably flashes each time one of containers 14 passes through the imaging area, i.e. in the optical path of camera 44. In some applications, diffuser/strobe assembly 50 may include a diffuser mask (not shown) to focus the illumination in a smaller area. A translucent diffuser lens (not shown) also may be mounted on top of base 48 for diffusing the light so that the entire container bottom portion 36 is illuminated more evenly. It is to be understood that in an alternative embodiment, the positions of camera 44 and base 48 may be interchanged and that other lighting arrangements may be used so long as the portion of container 14 including the mold code is illuminated. Also, alternative means may be used for transporting container 14 to base 48 provided that the mold code of container 14 is illuminated and travels in the optical path of camera 44.

Camera 44, which includes a wide angle lens 60, generates an image of the inside of container 14 as container 14 is carried over the base 48. In particular, container 14 has an axis of symmetry 62 and camera 44 has an optical axis 64 defined by the lens 60. According to the invention, camera 44 generates the image of container 14 including bottom portion 36 and heel portion 34 when the axes 62, 64 are generally coaxial. In other words, camera 44 generates an image of at least the portion including the mold code when container 14 is approximately centered beneath camera 44. System 10 then utilizes visual imaging and computer analysis techniques for inspecting empty containers 14 to detect which of the plurality of molds 18 formed a particular container 14. In addition, system 10 inspects containers 14 to detect the presence of production defects, contamination and/or damage. The visual imaging techniques employed by system 10 extract information regarding variations in shading to detect the mold code and/or defects.

Referring again to FIG. 1, in addition to inspection station 22, system 10 includes an electronic control 66. The electronic control 66 includes a computer 68 which communicates with inspection station 22 via a line 70 embodied as large interface cables. The computer 68 preferably includes a central processing unit as well as the other circuit boards that perform image acquisition and processing tasks. A monitor 72 displays information regarding the inspection and a power supply 74 provides power to each component of system 10. Inspection system 10 also communicates with container molding apparatus 16 via a line 76. If a consistent failure or undesirable trend exists, and this failure or trend is due to containers 14 being made in a particular mold 18, inspection system 10 informs the automated control of container molding apparatus 16 (or the operator) which mold 18 is providing unacceptable containers 14. Thus, the problem can be corrected or molding apparatus 16 can be completely or partially shut down to diagnose the problem more fully. In a preferred embodiment of the invention, computer 68 executes a series of diagnostic routines for determining the cause of the defect and for prescribing corrective actions to prevent the defect from recurring in containers 14 subsequently formed by molding apparatus 16.

With respect to the inspection process, CCD cameras such as camera 44 consist of an array of light sensors known as charge-coupled devices. The output of the sensors form an image with respect to their spatial location. Generally, spatial sampling of the sensors is analogous to superimposing a grid on the imaged portion of container 14 and examining the energy output from each grid box. Each spatial location in the image (or grid) is known as a picture element, or pixel. Computer 68 advantageously performs analog-to-digital conversion whereby a number, or pixel value, is assigned as a function of the amount of energy observed at each spatial location of the sensor array of camera 44. Computer 68 assigns pixel values to the electrical signals from camera 44 to form a matrix of numbers, i.e., a digital representation of the image. The size of the sampling grid is given by the number of pixels on each side of the grid. According to the invention, camera 44 resolves the image of container heel and bottom portions 34, 36 into an array of 512×512 pixels. For each pixel, the camera 44 produces an analog voltage signal that computer 68 converts to an 8-bit digital value. As container transport assembly 38 carries container 14 through inspection station 22, acquisition sensor 52, camera 44, diffuser/strobe assembly 50, and computer 68 cooperate to capture the image of the mold code of container 14. The image of the mold code is also referred to herein as the pattern image corresponding to the identifying pattern of container 14.

According to the invention, a memory 78 of computer 68 stores the image generated by camera 44 as an array of 512×512 pixels having 256 gray levels. Computer 68 then analyzes the gray level changes of the image stored in the memory 78 to detect the presence of identifying marks in the image. In one preferred embodiment, memory 78 also stores identification information corresponding to a set of reference patterns. The reference patterns correspond to the mold codes used by molding apparatus 16 as imaged by camera 44. Industry standards define various reference patterns for identification of a container's mold of origin. Computer 68 compares the pattern of marks detected in the image to the reference patterns stored in memory 78 and retrieves the identification information that corresponds to the mold code of the particular container 14. In this manner, system 10 identifies container 14 with respect to its mold 18 of origin. Thus, computer 68 in combination with memory 78 constitutes an image processor for detecting an optical characteristic of the image within a defined region of the image and for detecting the pattern image as a function of the detected characteristic.

In an alternative embodiment, computer 68 analyzes the gray level changes of the image stored in the memory 78 to detect the presence of identifying marks in the image and then executes stored routines for directly decoding the detected marks. In this embodiment, computer 68 identifies the size and position of marks in the image and generates a signal corresponding to the mold code consisting of the identified marks and representative of a mold number identifying the particular mold 18 in which container 14 originated.

Figure 5A:
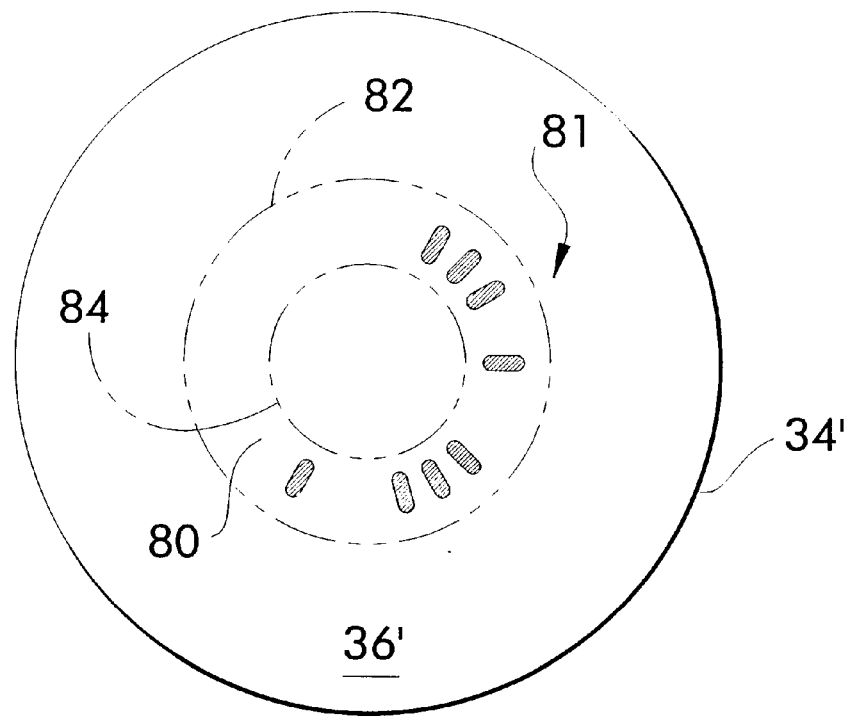
FIGS. 5A and 5B illustrate exemplary mold codes on the bottom and heel portions, respectively, of the container of FIG. 2.
Figure 5B:
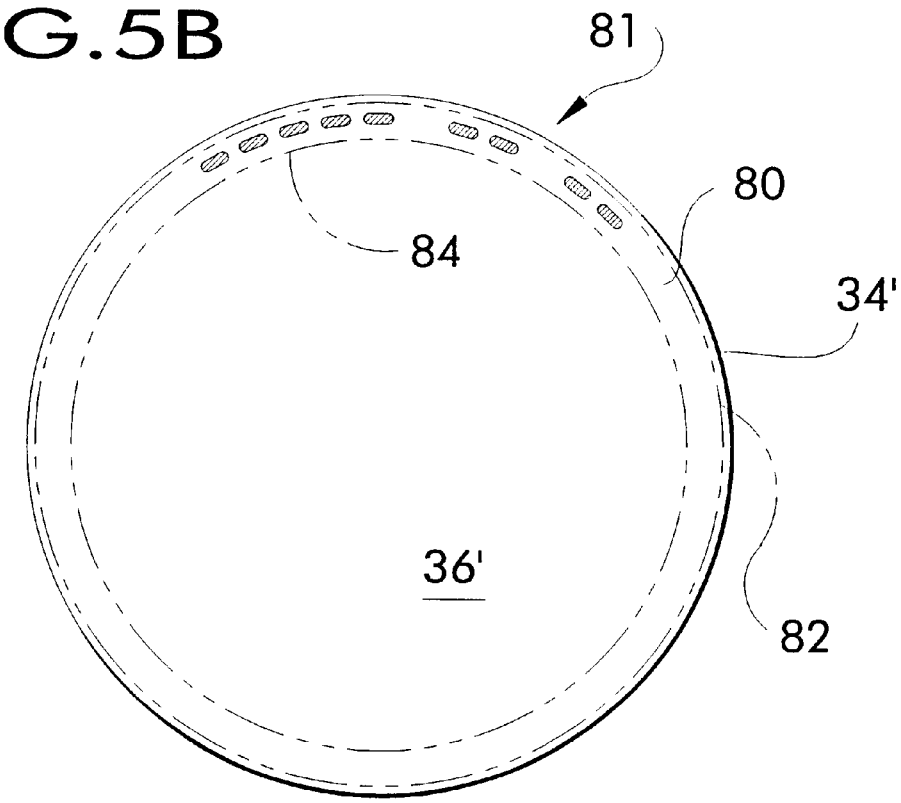

FIGS. 5A and 5B illustrate exemplary images of at least the portion of container 14 including the identifying pattern as generated by camera 44. In particular, FIG. 5A illustrates the image of an exemplary dot code on bottom portion 36 and FIG. 5B illustrates the image of an exemplary heel code on heel portion 34. A reference character 34' indicates the portion of the image showing heel portion 34 and a reference character 36' indicates the portion of the image showing bottom portion 36.

According to the invention, computer 68 defines a window region 80 including a pattern image 81 showing the container's mold code. By examining the image within the defined window region 80, rather than examining the entire image, computer 68 simplifies and speeds up processing of the image. In one preferred embodiment, region 80 is defined by a generally circular outer periphery 82 (shown in phantom) and a generally circular inner periphery 84 (also shown in phantom). The shape of region 80 is preferably annular for many mold codes because they are circular or arranged radially about the center of bottom portion 36. Further, region 80 is defined on the image at either the heel image portion 34' or bottom image portion 36' where the pattern image 81 is expected. In other words, region 80 is defined on the center of the bottom image portion 36'. With respect to the shape of region 80, it is to be understood that region 80 may be defined by only the periphery 82 or may be of various shapes depending on the desired region to be examined.

As described above, in one preferred embodiment, region 80 comprises a generally annular region defined by generally circular outer periphery 82 and generally circular inner periphery 84. Preferably, the size of region 80 approximates the maximum size of pattern image 81. As such, for a container 14 which is free of defects in the vicinity of its mold code, region 80 includes substantially only the image of the mold number markings.

The process of sampling the output of the sensor array of camera 44 in a particular order is known as scanning and provides conversion of a two-dimensional energy signal, or image; to a one-dimensional electrical signal that can be processed by computer 68. According to the invention, system 10 utilizes circular/radial scanning for gradient processing instead of conventional horizontal/vertical scanning. This is because the features of a mold code are often either round or positioned radially about the center of bottom portion 36. To facilitate processing of the image, computer 68 transforms the polar coordinates of the pixels in defined region 80 to an (x,y) coordinate system. In other words, computer 68 "unwraps" the annular region. The circular/radial scanning technique preferably employs a sine/cosine transform in combination with a "nearest neighbor" approximation.

As an example of unwrapping defined window region 80, the generally annular region shown in FIGS. 5A and 5B has an inner radius of $r_{IN}$ pixels (i.e., the radius of inner periphery 84) and has an outer radius of $r_{OUT}$ pixels (i.e., the radius of outer periphery 82). In this instance, region 80 can be approximated by a number of radial strips of pixels positioned around the center of defined region 80. The number of pixels around outer periphery 82 of region 80 determines the maximum number of radial strips in region 80. Thus, MAX NUMBER STRIPS=$(2\pi * r_{OUT})$; and MIN STRIP ANGLE $\theta_{min}$=(360°→MAX NUMBER STRIPS). The addresses, or positions, of the pixels in the radial strip at a particular strip angle, are defined by:

$x_n$=the nearest integer value of $\{\cos\theta*(r_{IN}+n)\}$;

and $y_n$=the nearest integer value of $\{\sin\theta*(r_{IN}+n)\}$ wherein:

$\theta$ is a multiple of $\theta_{min}$; each radial strip has $(r_{OUT}-r_{IN})$ pixels; and n is representative of the position of the pixels in the radial strip where n=0 on inner periphery 84 and n=$(r_{OUT}-r_{IN})$ on outer periphery 82.

Thus, each radial strip will have the same number of pixels wherein some pixels occupy the same position. Memory 78 stores the radial strips resulting from the circular/radial scanning as an (x,y) array such that circles are plotted as horizontal lines and radii are plotted as vertical lines.

As described above, camera 44 generates an image comprising a plurality of pixels, each pixel having a value representative of a detected optical characteristic of the image. In this instance, the pixel values correspond to the intensity of the pixels as represented by their gray levels. In the vision system arts, edges are defined as regions in the image where there is a relatively large change in gray level over a relatively small spatial region. According to the invention, computer 68 performs several routines for analyzing the image, including edge detection routines that analyze the gray level changes in defined window region 80 for detecting the presence of marks. Various edge detection operators, or algorithms, for finding and counting edges in an image are known to those skilled in the art. For example, suitable edge detection routines include Sobel or Prewit algorithms. In particular, computer 68 of system 10 defines edges in the image from the unwrapped data as a function of a gradient, including a "nearest neighbor" approximation, of the pixel values. It is to be understood that in addition to intensity or intensity gradient, other characteristics of the image, such as color or contrast, may be used to optically distinguish the identifying pattern from the image of container 14.

In a preferred embodiment of the invention, computer 68 then performs connectivity analysis to group the detected edges in the image as a function of their coordinates. In this manner, computer 68 defines marks, or objects, of the mold code of container 14. The defined objects are described by a bounding box and their (x,y) position. For example, the bounding box is the smallest rectangle that would enclose a regular-shaped object and, thus, is indicative of the object's size. In the alternative, the defined objects may be described by conventional blob analysis, by examining the shape of the object (e.g., the ratio of the object's major and minor axes) or by examining the area of the object.

According to the invention, memory 78 stores a plurality of reference marks having predetermined sizes and positions which correspond to the plurality of identifying patterns used by molding apparatus 16. Computer 68 validates the defined marks of the detected pattern image by comparing them to the stored reference marks and disregarding each defined mark that does not substantially match the size and position of at least one of the stored reference marks. Computer 68 further segments the unwrapped defined window region 80 into a plurality of zones and detects the mold code based on the presence or absence of the detected marks within at least one of the zones. In other words, the unwrapped region is segmented into zones containing marks and zones not containing marks (i.e., blank zones). Once these zones are located, their x positions can be translated into angular coordinates. Computer 68 records the starting and ending angles of each zone and compares the angular width of each zone to stored data. A zone containing marks that matches the angular width criteria of a mold number and that is framed by the correct size blank zones is considered a valid mold number. Computer 68 then reads the mold number wherein the presence of a mark is considered a "1" and the absence of a mark is considered a "0". Computer 68 uses this binary code to index a table stored in memory 78 which represents the mold number for a given manufacturer of mold apparatus 16.

FIGS. 6A–6D illustrate an exemplary flow diagram describing the operations of computer 68 for reading mold codes according to the invention.

Figure 6A:
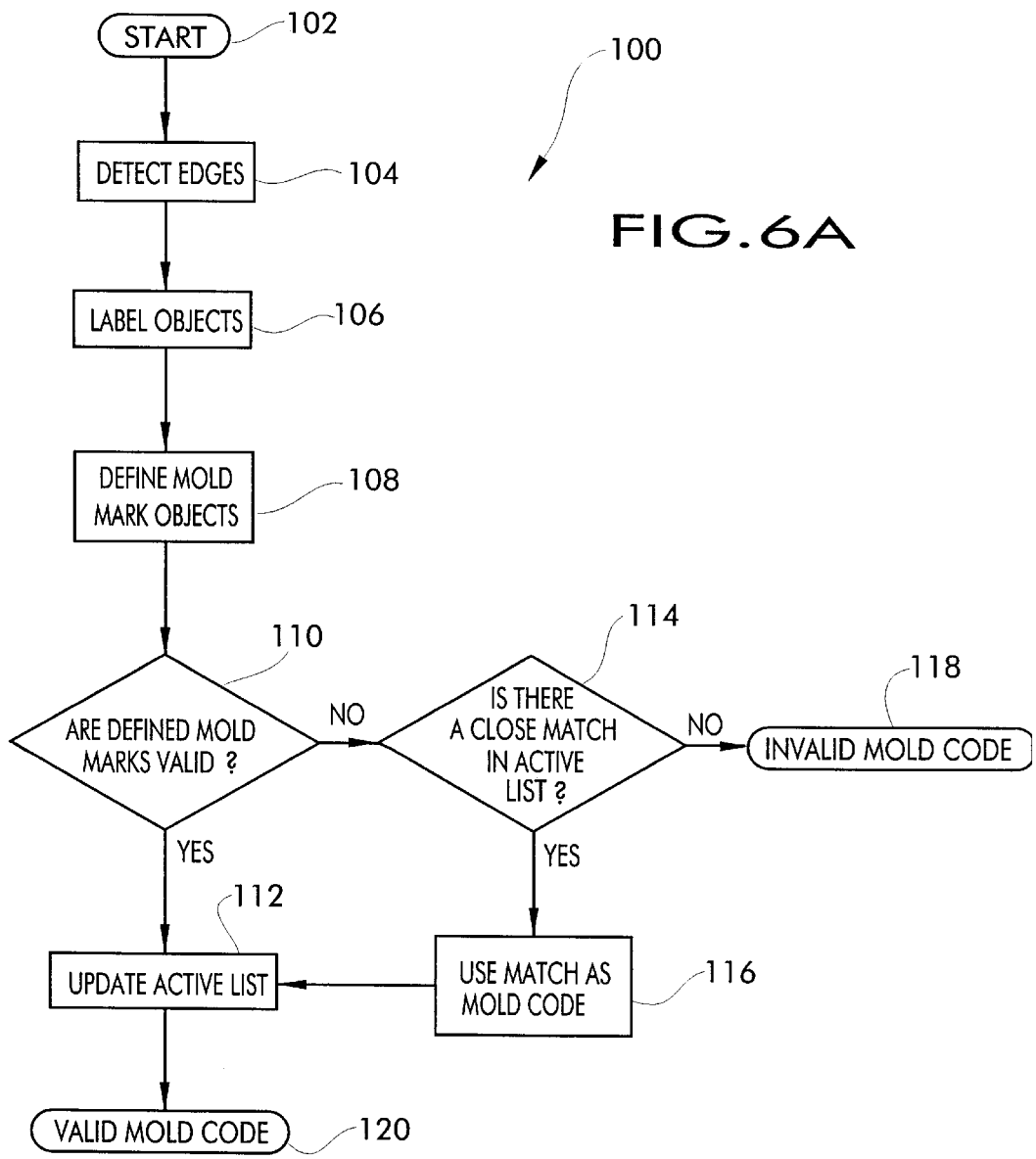

FIG. 6A shows a flow diagram 100 according to the present invention in general. Computer 68, including an Intel image processor, a general-type RISC processor programmed to perform image analysis, or like processor, executes stored routines to perform the functions of the flow diagram 100. At step 102, computer 68 begins its analysis of the mold identifying pattern of container 14 as imaged by camera 44. Computer 68 first detects edges in the image at step 104 and then proceeds to step 106 for labeling objects based on the detected edges. As described above, edges are defined as regions in the image where there is a relatively large change in gray level over a relatively small spatial region. Computer 68 groups the detected edges to define objects in the image. At step 108, computer 68 identifies which of the labeled objects are considered objects corresponding to a mold code and then, at step 110, computer 68 decides if the identified mold marks constitute a valid mold code. In one embodiment, computer 68 compares the labeled objects to stored reference marks with respect to their size and position and discards the labeled objects that do not substantially match the size and position of at least one of the stored reference marks. Thus, computer 68 identifies and validates the mold marks.

Figure 6C:
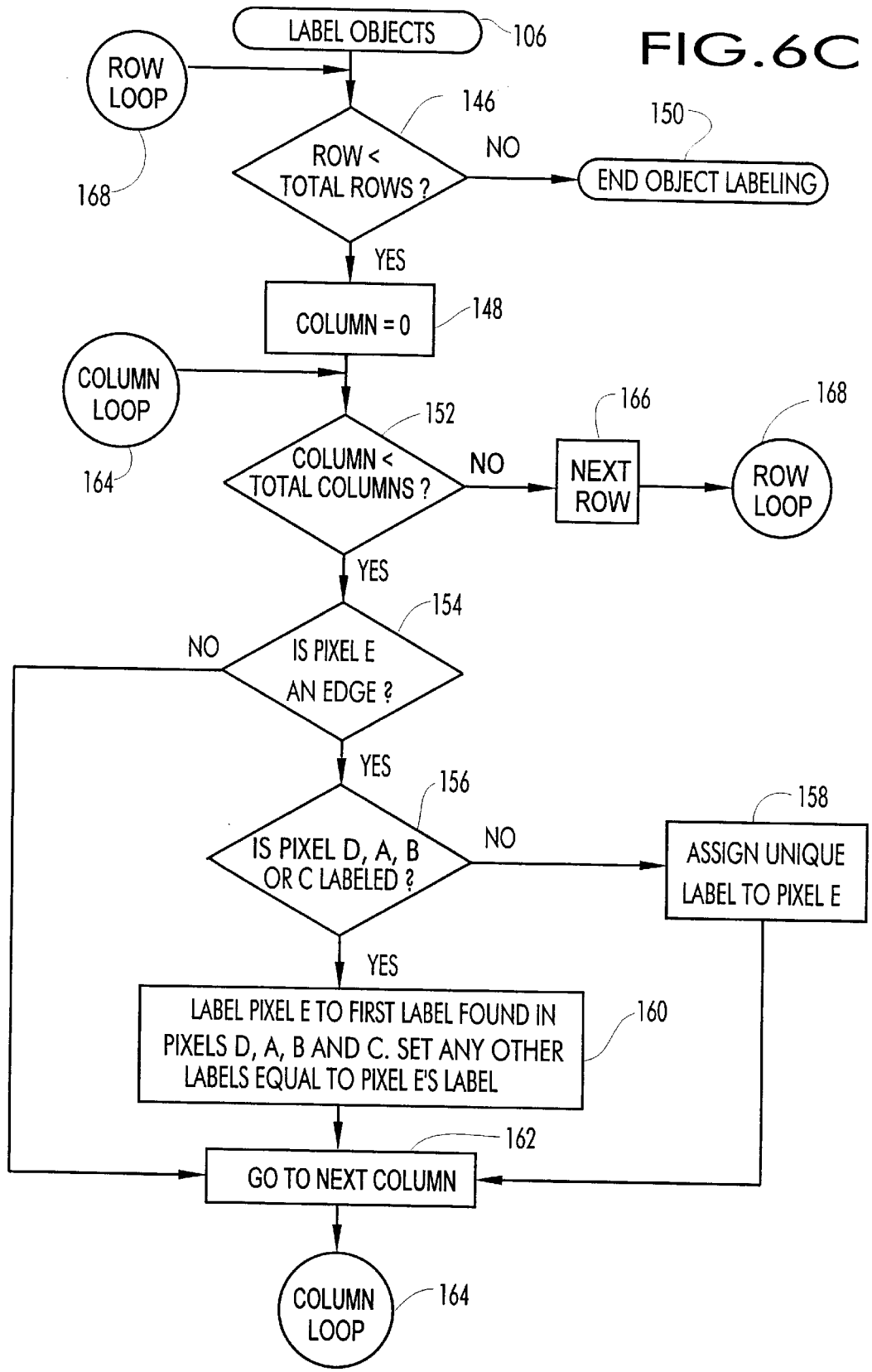

According to the invention, computer 68 maintains in memory 78 an active list of mold codes identifying which molds 18 are currently in use by molding apparatus 16. If, at step 110, the identified mold marks are valid, computer 68 updates the active list of mold codes at step 112. On the other hand, if the labeled objects are not valid mold marks, computer 68 determines at step 114 whether a close match is found in the active mold code list. If so, computer 68 uses the close match as the mold code at step 116 and then updates the active list at step 112. However, if a close match cannot be found in the active list, computer 68 determines at step 118 that the mold code is invalid. In contrast to step 118, computer 68 proceeds from step 112 to step 120 for determining that the mold code is valid. FIGS. 6B–6D illustrate the steps of flow diagram 100 in greater detail.

FIG. 6B shows the edge detection step 104 in greater detail. In general, computer 68 examines each of the pixels in defined region 80 one at a time with respect to the pixels surrounding the pixel under examination. In a preferred embodiment, computer 68 begins with the upper left corner of the transformed (x,y) coordinate system, examines each pixel in the top row from left to right, and then moves down to the next row. Computer 68 then repeats its examination for the next row. It is to be understood, however, that a different originating position may be selected or a different scanning technique employed.

Proceeding to step 122, computer 68 first determines the row number of the pixel being examined. In this instance, the pixel under examination, i.e., the pixel at the current row and column number, is designated pixel E and is at the center of a three-by-three matrix of pixels:

| A | B | C |
|---|---|---|
| D | E | F |
| G | H | I |

The matrix of pixels is also referred to as a kernel, template or structuring element. If the pixel's row number is less than the total number of rows, the edge detection routine continues because computer 68 has not yet examined each of the pixels in region 80. At step 124, computer 68 sets the column number to zero, thus, beginning examination of the pixels. On the other hand, when the row number reaches the total number of rows in region 80, computer 68 ends the edge detection routine at step 126.

Proceeding to step 128, computer 68 determines the column number of the pixel being examined, i.e., pixel E. As before, if the column number of pixel E is less than the total number of columns, which it will be beginning with column=0, the edge detection routine continues because computer 68 has not yet examined each of the pixels in the particular row of region 80. At step 130, computer 68 determines the gradient for pixel E as a function of the pixel values of the surrounding pixels. According to the invention, GRADIENT=(A+2D+G)–(C+2F+I). At step 132, computer 68 compares the determined gradient to a threshold for finding edges. Step 130 is merely exemplary and it is to be understood that a different gradient formula may be used. Depending on the gradient formula used in step 130, the comparison of step 132 may vary. For example, a different threshold may be used, the absolute value of the gradient may be compared to the threshold or the inequality may be reversed.

At step 134, computer 68 defines pixel E as an edge if the determined gradient exceeds the threshold at step 132. If the determined gradient does not exceed the threshold, however, computer 68 defines pixel B as not being an edge. Following either step 134 or 136, computer 68 proceeds to step 138 at which computer 68 returns to step 128 via a column loop 140.

Again at step 128, computer 68 determines the column number of the pixel being examined. If the column number of the new pixel E is less than the total number of columns, the edge detection routine continues because computer 68 has not yet examined each of the pixels in the particular row of region 80 and computer 68 proceeds to step 130. Otherwise, computer 68 proceeds to the next row at step 142 by returning to step 122 via a row loop 144. Likewise, at step 122, if the row number of the new pixel E is less than the total number of rows, the edge detection routine continues because computer 68 has not yet completed the scan of region 80 and computer 68 proceeds to step 124. Otherwise, when the row number reaches the total number of rows in region 80, computer 68 ends the edge detection routine at step 126.

FIG. 6C shows the object labeling step 106 in greater detail. In a manner similar to the edge detection routine shown in FIG. 6B, beginning at step 146, computer 68 first determines the row number of the pixel being examined (i.e., pixel E). If the pixel's row number is less than the total number of rows, the object labeling routine continues because computer 68 has not yet examined each of the pixels in region 80. At step 148, computer 68 sets the column number to zero, thus, beginning examination of the pixels. On the other hand, when the row number reaches the total number of rows in region 80, computer 68 ends the object labeling routine at step 150.

Proceeding to step 152, computer 68 determines the column number of pixel E. As before, if the column number of pixel E is less than the total number of columns, which it will be beginning with column=0, the object labeling routine continues because computer 68 has not yet examined each of the pixels in the particular row of region 80. At step 154, computer 68 determines whether pixel E is defined to be an edge. If so, then computer 68 proceeds to step 156 at which it determines if any of the surrounding pixels are already labeled. For example, at step 156, computer 68 determines if pixels D, A, B or C are labeled. If none of these pixels are already labeled, computer 68 assigns a unique label to pixel E at step 158. If, on the other hand, at least one of pixels D, A, B or C already has a unique label, computer 68 labels pixel E at step 160 with the same label previously assigned to the first pixel in the sequence of pixels D, A, B and C. For example, if pixel E is an edge, pixels B and C are labeled and pixels D and A are not labeled, then pixel E will be assigned the same label as pixel B. The other labels for the pixels in this sequence are then set to pixel E's label at step 160. In the example, pixels E, B and C will all have the same label. Following step 160, computer 68 proceeds to step 162 at which computer 68 returns to step 152 via a column loop 164.

Again at step 152, computer 68 determines the column number of the pixel being examined. If the column number of the new pixel E is less than the total number of columns, the object labeling routine continues because computer 68 has not yet examined each of the pixels in the particular row of region 80 and computer 68 proceeds to step 154. Otherwise, computer 68 proceeds to the next row at step 166 by returning to step 146 via a row loop 168. Likewise, at step 146, if the row number of the new pixel E is less than the total number of rows, the object labeling routine continues because computer 68 has not yet completed the scan of region 80 and computer 68 proceeds to step 148. Otherwise, when the row number reaches the total number of rows in region 80, computer 68 ends the object labeling routine at step 150.

FIG. 6D shows the active list updating step 112 in greater detail. As shown in FIG. 6D, for each inspection job, a given range of mold numbers is used, each mold number corresponding to one mold 18. The active list updating routine 112 begins at step 170 wherein computer 68 determines whether the identified mold code, representing one of molds 18, is in an active list of mold codes maintained in memory 78. If so, the mold code remains on the active list at step 172. On the other hand, if the mold code is not on the active list, computer 68 determines whether it is on the pending status list at step 174. Proceeding to step 176, computer 68 designates the mold code's status as pending if the mold code is not already on the pending status list. If the mold code is already on the pending status list, however, computer 68 determines at step 178 if the mold code has been identified with respect to enough containers 14 to consider it as being active. If so, computer 68 places the mold code on the active list. As an example, if a particular mold code has been identified ten times for the last one thousand containers 14, then it is assumed that the particular mold 18 associated with this code is being used and the mold code is placed on the active list. Proceeding then to step 182, computer 68 sets a pointer to the start of the active list.

Following step 176, computer 68 proceeds to step 182 after making the mold code status pending. Likewise, computer 68 proceeds to step 182 from step 178 if the mold code has not been identified with respect to enough containers 14 to consider it as being active.

Following steps 170 to 182, computer 68 examines each of the mold codes in the active list to determine which, if any, have become inactive. At step 184, computer 68 determines whether the mold code is the last mold code in the list. In this embodiment of the invention, if the last mold code in the active list has been processed, computer 68 ends the active list updating routine at step 186. Otherwise, computer 68 proceeds to step 188 for determining if the mold code has been identified recently. If not, computer 68 makes the mold status inactive at step 190. The pointer is moved to the next mold code in the active list as step 192. Computer 68 then returns to step 184 via mold status loop 194. As an example, if a mold code has not been identified for the last one thousand containers, it is assumed that the particular mold 18 associated with this code is not being used and the mold code is removed from the active list.

In the alternative, computer 68 maintains a plurality of counters for each mold code it reads for updating the active list. For example, a first counter maintains the current total count (COUNT 1) which represents the number of times computer 68 reads the particular mold code. Computer 68 updates COUNT 1 after inspection of each container 14. Every N containers 14, computer 68 stores COUNT 1 in memory 78 as the last total count (COUNT 2). In the example, a second counter maintains COUNT 2. Further to the example, a third counter maintains the production rate count (COUNT 3) which computer 68 updates every N containers 14. In this embodiment, computer 68 calculates COUNT 3 by subtracting COUNT 2 from COUNT 1. Thus, COUNT 3 remains high as long as molding apparatus 16 produces containers 14 having the given mold code. On the other hand, COUNT 3 drops to zero when the corresponding mold is replaced or is no longer producing containers 14.

In the event that computer 68 incorrectly reads a mold code, COUNT 3 corresponding to that mold code will remain at a relatively low number and will not reach a predetermined count. In this instance, the predetermined count is representative of the number of containers 14 expected to be produced by one mold 18 during a given time for a typical production run. On the other hand, mold codes having a relatively high COUNT 3 are considered to be active mold codes that were read correctly. After COUNT 3 has been updated enough times to establish an active list, computer 68 corrects any incorrectly read mold codes by finding an active mold code that closely matches it. The invalid mold code's counters are then added to the matched mold code's counters and reset.

With respect to matching mold codes, in one preferred embodiment, computer 68 performs a matching algorithm to "exclusive OR" the current mold code, represented by a number of binary digits, with each mold code in the active list. This generates a count of differing bits for each active mold code. Computer 68 then considers the lowest differing bit count to be the closest match.

As described above, computer 68 also executes various inspection routines to inspect container 14 for defects or undesirable production trends, such as color variations, thin bottoms, soft blisters and dirty bottoms. A suitable inspection system in which the present invention may be incorporated is the Superscan II, manufactured by BWI Inex Vision Systems, 13327 U.S. Highway 19 North, Clearwater, Fla. 34624. Preferably, computer 68 executes different inspection algorithms which are suited for detection of different types of defects. For example, the image processor of the invention overlays a pattern of concentric inspection zones onto the image of bottom portion 36 of each container 14 as it passes through inspection station 22. The inspection zones divide the image into separate areas, each having the ability to perform different tests. The tests find defects in bottom portion 36 using a variety of algorithms to analyze the image for variations in light intensity.

In one embodiment, each inspection zone can have up to four test categories assigned at the same time. The tests assigned to a zone can be all different, or they can be of the same category with different parameters. One such test involves analyzing a radial strip average for variations in pixel intensity between average values of pixels along radial paths from inner circle 84 to outer circle 82 of region 80. Other tests involve either circular scanning or horizontal or vertical scanning to detect edges in the image where defects are defined by the number of detected edges within a given area. Another test involves analyzing a histogram of the gray values within region 80. Essentially, the histogram is a density analysis of the gray levels. In this instance, defects are defined by a peak in the histogram falling outside a user-defined range.

System 10 may be used in combination with, for example, a weight station, pushup measuring system and/or optical profile measuring apparatus for further inspection. U.S. Pat. No. 4,906,098, the entire disclosure of which is incorporated herein by reference, discloses one preferred embodiment of optical profile measuring apparatus and commonly assigned patent U.S. Pat. No. 5,675,517, the entire disclosure of which is incorporated herein by reference, discloses a preferred pushup sensor.

Other inspection systems, measuring devices, and improvements for such are disclosed in U.S. Pat. No. 4,082,463, U.S. Pat. No. 4,074,938, and U.S. Pat. No. 4,097,158, the entire disclosures of which are also incorporated herein by reference. U.S. Pat. No. 4,082,463 shows a calibrated optical micrometer and U.S. Pat. No. 4,074,938 shows an optical dimension measuring device employing an elongated, focused beam. U.S. Pat. No. 4,097,158 shows a half-maximum threshold circuit for an optical micrometer.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for identifying containers each having a portion including one of a plurality of identifying patterns which identify the container, said system for use with a container handling apparatus that handles the containers, said system comprising:

a camera for generating an image of at least the portion of the container including the identifying pattern, said image comprising a plurality of pixels and including a pattern image corresponding to the identifying pattern; and an image processor for detecting an optical characteristic of the image within a defined region of the image and for detecting the pattern image as a function of the detected characteristic, said image processor determining the container's identifying pattern as a function of the pattern image thereby to identify the container, said defined region of the image being generally annular and having an inner radius of $r_{IN}$ pixels and an outer radius of $r_{OUT}$ pixels, said pixels having coordinates with respect to a polar coordinate system and said image processor transforming the polar coordinates of the pixels to $(x_n, y_n)$ coordinates by defining:

$x_n$=the nearest integer value of $\{\cos\theta*(r_{IN}+n)\}$;

and $y_n$=the nearest integer value of $\{\sin\theta*(r_{IN}+n)\}$ wherein:

$(2\pi * r_{OUT})$ defines a maximum number of radial strips in the defined region; $\theta$ is a multiple of $\theta_{min}$ which is defined as $\{360° \div (2\pi * r_{OUT})\}$; each radial strip has $(r_{OUT}-r_{IN})$ pixels; and n is representative of the position of the pixels in the radial strips where n=0 at the inner radius of the defined region and n=$(r_{OUT}-r_{IN})$ at the outer radius of the defined region.

2. The system of claim 1 further comprising a memory storing identification information corresponding to the plurality of identifying patterns and wherein the image processor retrieves the identification information that corresponds to the identifying pattern of the container from the memory as a function of the detected pattern image.

3. The system of claim 2 wherein the identifying pattern comprises a plurality of marks and wherein the image processor groups the detected edges as a function of their coordinates to define the marks of the identifying pattern and retrieves the identification information from the memory that corresponds to the identifying pattern based on the defined marks.

4. The system of claim 3 wherein the identification information stored in the memory comprises a plurality of reference marks which correspond to the plurality of identifying patterns, said reference marks having predetermined sizes and positions, and wherein the image processor compares the defined marks of the identifying pattern to the stored reference marks and disregards each defined mark that does not substantially match the size and position of at least one of the stored reference marks.

5. The system of claim 2 wherein the identification information stored in the memory comprises data representative of a plurality of pattern images corresponding to the plurality of identifying patterns, and wherein the image processor compares the detected pattern image to the plurality of pattern images and retrieves the identification information that corresponds to the identifying pattern of the container from the memory based on the comparison.

6. The system of claim 2 wherein the identification information stored in the memory comprises a list indicating which of the plurality of identifying patterns are active and wherein the image processor updates the active list as a function of the detected pattern image.

7. The system of claim 1 wherein the pixel values correspond to the intensity of the pixels and wherein the characteristic of the image detected by the image processor is a gradient of the pixel values.

8. The system of claim 1 wherein the defined region comprises a plurality of zones and wherein the image processor detects the pattern image based on the presence or absence of the detected edges within at least one of the zones.

9. The system of claim 1 wherein the defined region comprises a generally annular region having an outer radius corresponding to the size of the pattern image.

10. The system of claim 1 wherein the defined region is approximately centered on the image of the bottom portion of the container.

11. The system of claim 1 wherein the container has an axis of symmetry and the camera has an optical axis and further comprising a position sensor for detecting the position of the container relative to the camera, said camera being responsive to the position sensor for generating the image of the portion of the container when the axis of symmetry of the container is generally coaxial with the optical axis of the camera.

12. The system of claim 1 further comprising a light source for illuminating the container including the identifying pattern thereby enabling the image of the container to be generated by the camera.

13. The system of claim 1 wherein the container molding apparatus has a plurality of molds and wherein the identifying pattern of each container corresponds to one of the plurality of molds in which the container was formed whereby the image processor identifies the mold which formed the container by determining the container's identifying pattern.

14. A method for identifying containers each having a portion including one of a plurality of identifying patterns, said method for use with a container handling apparatus that handles the containers, said method comprising the steps of:

generating an image with a camera of at least the portion of the container including the identifying pattern, said image comprising a plurality of pixels and including a pattern image corresponding to the identifying pattern, said pixels having coordinates with respect to a polar coordinate system;

defining a region of the image, said defined region being generally annular and having an inner radius of $r_{IN}$ pixels and an outer radius of $r_{OUT}$ pixels;

transforming the polar coordinates of the pixels to $(x_n, y_n)$ coordinates by defining:

$x_n$=the nearest integer value of $\{\cos\theta*(r_{IN}+n)\}$;

and $y_n$=the nearest integer value of $\{\sin\theta*(r_{IN}+n)\}$ wherein:

$(2\pi * r_{OUT})$ defines a maximum number of radial strips in the defined region; $\theta$ is a multiple of $\theta_{min}$ which is defined as $\{360° \div (2\pi * r_{OUT})\}$; each radial strip has $(r_{OUT}-r_{IN})$ pixels; and n is representative of the position of the pixels in the radial strips where n=0 at the inner radius of the defined region and n=$(r_{OUT}-r_{IN})$ at the outer radius of the defined region;

detecting an optical characteristic of the image within the defined region;

detecting the pattern image as a function of the detected characteristic; and determining the container's identifying pattern as a function of the detected pattern image thereby to identify the container.

15. The method of claim 14 further comprising the steps of storing identification information corresponding to the plurality of identifying patterns in a memory and retrieving the identification information that corresponds to the identifying pattern of the container from the memory as a function of the detected pattern image.

16. The method of claim 15 wherein the identifying pattern comprises a plurality of marks and further comprising the step of grouping the detected edges as a function of their coordinates to define the marks of the identifying pattern wherein the identification information that corresponds to the identifying pattern is retrieved from the memory based on the defined marks.

17. The method of claim 16 wherein the identification information stored in the memory comprises a plurality of reference marks which correspond to the plurality of identifying patterns, said reference marks having predetermined sizes and positions, and further comprising the steps of comparing the defined marks of the identifying pattern to the stored reference marks and disregarding each defined mark that does not substantially match the size and position of at least one of the stored reference marks.

18. The method of claim 15 wherein the identification information stored in the memory comprises data representative of a plurality of pattern images corresponding to the plurality of identifying patterns, and further comprising the step of comparing the detected pattern image to the plurality of pattern images wherein the identification information that corresponds to the identifying pattern of the container is retrieved from the memory based on the comparison.

19. The method of claim 15 wherein the identification information stored in the memory comprises a list indicating which of the plurality of identifying patterns are active and further comprising the step of updating the active list as a function of the detected pattern image.

20. The method of claim 14 wherein each pixel has a value representative of the detected characteristic of the image and wherein the step of detecting the identifying pattern comprises detecting edges in the defined region as a function of the pixel values.

21. The method of claim 20 wherein edge detection step includes determining coordinates of the detected edges with respect to the $(x_n,y_n)$ coordinates of the pixels.

22. The method of claim 20 wherein the pixel values correspond to the intensity of the pixels and wherein the step of detecting a characteristic of the image comprises detecting a gradient of the pixel values.

23. The method of claim 20 further comprising the step of segmenting the defined region of the image into a plurality of zones whereby the pattern image is detected based on the presence or absence of the detected edges within at least one of the zones.

24. The method of claim 14 wherein the step of defining a region of the image comprises defining a generally annular region having an outer radius corresponding to the size of the pattern image.

25. The method of claim 14 wherein the defining step includes approximately centering the defined region on the image of the bottom portion of the container.

26. The method of claim 14 wherein the container has an axis of symmetry and the camera has an optical axis and further comprising the step of detecting the position of the container relative to the camera, said camera being responsive to the detected position for generating the image of the portion of the container when the axis of symmetry of the container is generally coaxial with the optical axis of the camera.

27. The method of claim 14 wherein the containers handled by the container handling apparatus are formed by a container molding apparatus having a plurality of molds and the identifying pattern of each container corresponds to one of the plurality of molds in which the container was formed, and further comprising the step of identifying the mold which formed the container by determining the container's identifying pattern.

28. The method of claim 27 for use with the container molding apparatus, further comprising the steps of detecting defects in the containers as a function of the detected characteristic thereby to identify defective containers formed by the container molding apparatus, providing feedback information to the container molding apparatus representative of the detected defects and the mold which formed each defective container, and adjusting the container molding apparatus based on the feedback information so that the defects are corrected in containers subsequently formed by the container molding apparatus.

29. The method of claim 14 further comprising the step of illuminating the container including the identifying pattern when the image of the container is generated by the camera.

* * * * *